(12) United States Patent
Fontanet et al.

(10) Patent No.: US 10,527,459 B2
(45) Date of Patent: Jan. 7, 2020

(54) INDUCTIVE POSITION SENSOR DESIGNED TO MEASURE THE ANGULAR POSITION OF A SHAFT OR THE LIKE

(71) Applicants: Continental Automotive France, Toulouse (FR); Continental Automotive GmbH, Hannover (DE)

(72) Inventors: Alain Fontanet, Muret (FR); Jean-louis Roux, Brax (FR)

(73) Assignees: Continental Automotive France, Toulouse (FR); Continental Automotive GmbH, Hannover (DE)

( * ) Notice: Subject to any disclaimer, the term of this patent is extended or adjusted under 35 U.S.C. 154(b) by 0 days.

(21) Appl. No.: 16/307,274

(22) PCT Filed: Jun. 2, 2017

(86) PCT No.: PCT/FR2017/051394
§ 371 (c)(1),
(2) Date: Dec. 5, 2018

(87) PCT Pub. No.: WO2017/212150
PCT Pub. Date: Dec. 14, 2017

(65) Prior Publication Data
US 2019/0234768 A1    Aug. 1, 2019

(30) Foreign Application Priority Data
Jun. 6, 2016 (FR) .................................... 16 55109

(51) Int. Cl.
*G01D 5/22* (2006.01)
*G01D 5/20* (2006.01)

(52) U.S. Cl.
CPC ......... *G01D 5/2275* (2013.01); *G01D 5/2053* (2013.01); *G01D 5/2291* (2013.01)

(58) Field of Classification Search
CPC ... G01D 5/2275; G01D 5/2053; G01D 5/2291
(Continued)

(56) References Cited

U.S. PATENT DOCUMENTS

| 6,124,708 A * | 9/2000 | Dames ................. G01D 5/2053 |
| | | 324/207.12 |
| 2004/0017190 A1* | 1/2004 | McDearmon .......... G01D 5/145 |
| | | 324/207.25 |

(Continued)

FOREIGN PATENT DOCUMENTS

| EP | 0182085 A2 | 5/1986 |
| EP | 0341412 A1 | 11/1989 |

(Continued)

OTHER PUBLICATIONS

English translation of the Written Opinion for International Application No. PCT/FR2017/051394, dated Sep. 15, 2017, 5 pages.

(Continued)

*Primary Examiner* — Reena Aurora
(74) *Attorney, Agent, or Firm* — RatnerPrestia

(57) ABSTRACT

This inductive position sensor is designed to measure the angular position of a shaft or the like and includes a support on which are realized, on the one hand, a primary winding, and on the other hand, at least two secondary windings in phase opposition with respect to each other. Each secondary winding is defined by a set of at least two loops in phase with each other. The secondary windings are connected in series and each arranged symmetrically with respect to a middle line so as to form each time a pattern on either side of this middle line, the two patterns having a separation between them in the area of said middle line. An assembly including such a sensor and a target with two oppositely directed helices.

9 Claims, 4 Drawing Sheets

(58) Field of Classification Search
USPC .................................................. 324/207.17
See application file for complete search history.

(56) References Cited

U.S. PATENT DOCUMENTS

| | | | | |
|---|---|---|---|---|
| 2006/0208725 A1* | 9/2006 | Tapson | ................. | G01D 5/2291 |
| | | | | 324/207.17 |
| 2009/0261844 A1* | 10/2009 | Howard | ............... | G01D 5/2026 |
| | | | | 324/655 |
| 2015/0204740 A1 | 7/2015 | Fericean et al. | | |

FOREIGN PATENT DOCUMENTS

| | | | |
|---|---|---|---|
| FR | 2170651 | A5 | 9/1973 |
| GB | 1381560 | A | 1/1975 |

OTHER PUBLICATIONS

International Search Report and Written Opinion for International Application No. PCT/FR2017/051394, dated Sep. 15, 2017—8 pages.
Notice of Allowance for Application No. 16/307,217, dated Sep. 16, 2019, 5 pages.

\* cited by examiner

INDUCTIVE POSITION SENSOR DESIGNED TO MEASURE THE ANGULAR POSITION OF A SHAFT OR THE LIKE

CROSS REFERENCE TO RELATED APPLICATIONS

This application is the U.S. National Phase Application of PCT International Application No. PCT/EP2017/051394, filed Jun. 2, 2017, which claims priority to French Patent Application No. 1655109, filed Jun. 6, 2016, the contents of such applications being incorporated by reference herein.

FIELD OF THE INVENTION

The present invention concerns an inductive position sensor designed to measure an angular position of a shaft or the like.

This type of sensor has the advantage of making it possible to determine the position of a mechanical part, or any other element, without the need for a contact with the part whose position is to be found. This advantage means that the applications of such sensors are very numerous in all types of industries. Such sensors are likewise used in mass market applications such as the field of automobiles within which aspects of the present invention have been realized. However, it can be used in other diverse and varied fields.

BACKGROUND OF THE INVENTION

The principle of operation of an inductive sensor is based on the variation in coupling between a primary winding and secondary windings of a transformer operating at high frequency and without the use of a magnetic circuit. The coupling between these windings varies as a function of the position of a movable conductor (of electricity) piece, generally known as a "target". Currents induced in the target will in fact modify the currents induced in the secondary windings. By adapting the configuration of the windings and knowing the current injected in the primary winding, measuring the current induced in the secondary windings makes it possible to determine the position of the target.

Document EP0182085, incorporated herein by reference, describes the principle of such an inductive sensor.

In order to integrate such an inductive sensor in a device, especially an electronic device, it is known how to make the aforementioned transformer on a printed circuit card. The primary winding and the secondary windings are then formed by tracks traced on the printed circuit card. The primary winding is then energized for example by an external high-frequency source and the secondary windings are then the site of currents induced by the magnetic field created by the circulation of a current in the primary winding. The target, which is a conductive piece, such as metal, can have a simple shape. For example, it may be a piece cut out from a metal sheet. In order to make a linear sensor, the cutout to form the target is for example rectangular, while for a rotary sensor this cutout will be for example in the form of an angular sector with radius and angle suited to the movement of the piece.

Generally, two sets of secondary windings are designed to accomplish sine and cosine functions of the target position in one complete run of the sensor. Such functions (cos and sin) are well known and can be easily processed by an electronic system. By forming the ratio of the sine to the cosine and then applying an arc tangent function, one obtains an image of the position of the target. The argument of the sine and cosine functions is a linear (or affine) function of the position of the target whose course then represents a more or less large portion of the spatial period of these trigonometric functions.

From a physical standpoint, the modification of the coupling between the primary circuit and the secondary circuits is realized thanks to the phenomenon of the electromagnetic skin effect, known to the person skilled in the art. The primary circuit being energized by a high-frequency source, the phenomena taking place in the entire sensor are high-frequency phenomena. The target whose position is to be found is a massive conductor piece and is the site of significant induced currents. The depth of penetration of these induced currents is relatively shallow (hence the term skin). For example, it is in the order of 50 μm in the case of an aluminum target. Thus, the induction does not penetrate into the target and the magnetic flux produced by the primary circuit thus bypasses the target. Due to this fact, the field lines are strongly modified. This modification is perceived by the secondary circuits which, depending on the position of the target, receive more or less flux. These fluxes are variable as a function of the position of the target and also variable as a function of time and therefore generate a voltage at the terminals of the secondary circuits. By measuring these voltages, one thus obtains a signal which, when analyzed, lets one know the position of the target.

When it is not possible to place a sensor at the end of a shaft to determine the angular position of that shaft, it is known how to provide the shaft with a helix which is placed opposite a linear sensor. In fact, if one looks at a helix in rotation relative to a fixed point, one sees from this fixed point a surface in axial displacement. Thus, it is as if the target were moving linearly in front of the sensor.

Thus, a linear sensor can give an indication as to the angular position of a shaft by adapting the shape of the target. However, when the shaft whose angular position is to be determined is moving axially, even if it is only parasitic movements, the angular measurement is falsified on account of this axial movement.

SUMMARY OF THE INVENTION

Therefore, an aspect of the present invention is to enable a measuring of the angular position of a shaft or the like in inductive technology (no contact), in radial position, that is, by being positioned at the side of the shaft and not at its end, being insensitive to the axial play.

Preferably, the sensor enabling this measurement will have a reduced footprint.

Advantageously, such a sensor will also allow measuring a longitudinal displacement (along the axis of rotation of the shaft). This will allow, for example, measuring at the same time of an angular position and/or a speed of rotation and an axial displacement. Such a measurement of longitudinal displacement could likewise be used in order to quantify a parasitic longitudinal movement.

For this purpose, an aspect of the present invention proposes an inductive position sensor designed to measure the angular position of a shaft or the like, comprising a support on which are realized, on the one hand, a primary winding and, on the other hand, at least two secondary windings in phase opposition to each other, each secondary winding being defined by a set of at least two loops in phase with each other.

According to an aspect of the present invention, the secondary windings are connected in series and are each arranged symmetrically with respect to a middle line so as to form each time a pattern on either side of this middle line, the two patterns having a separation between them in the area of said middle line.

Such a sensor is designed to work with a double helix having two helices one alongside the other, the two helices being of opposite direction and spaced apart from one another. The two patterns defined above are separated so that, even if the shaft carrying the target in the form of a double helix is moving longitudinally—for example, parasitic vibrations—each pattern can remain opposite a helix without being influenced by the other one.

The proposed sensor thus makes it possible to obtain a signal depending solely on the angular position of the shaft carrying the target while being insensitive to any variation in longitudinal position, parasitic or desired. In fact, it is possible to cancel out the variations in flux due to longitudinal displacements in the loops of the secondary circuit proposed.

In a first embodiment, the inductive position sensor described above is such that each pattern is constituted of a first set of loops of a first winding adjacent to a second set of loops of a second winding, the loops of the first winding having a form similar to the loops of the second winding and the number of loops of the first set being equal to the number of loops of the second set.

In one alternative embodiment of the position sensor described above, each pattern is constituted of a first set of loops of a first winding adjacent to a second set of loops of a second winding and to a third set of loops of the second winding, the loops of the first winding having a surface which is double that of the loops of the second winding, the number of loops being equal for the three sets and the loops of the first set of loops being disposed between the loops of the second set of loops and those of the third set of loops in order to form an alignment of loops perpendicular to the middle line.

In order for the inductive position sensor described to be able moreover to perform a measurement of longitudinal position, this sensor advantageously comprises moreover at least two additional secondary windings in phase opposition with respect to each other and connected in series with each other; each additional secondary winding is defined by a set of at least two loops in phase with each other; the loops of an additional secondary winding are disposed in symmetrical manner to the loops of the other additional secondary winding in respect of said middle line, and the loops of one additional secondary winding form, on one side of the middle line with the loops of the other additional secondary winding located on the same side of the middle line, a pattern separate from the pattern formed by the other loops of the additional secondary windings.

An aspect of the present invention likewise concerns an assembly formed by an inductive position sensor and a target, distinguished in that the position sensor is a position sensor as described above, in that the target comprises two helices of opposite pitches, and in that the inductive position sensor is disposed facing the target such that on the one hand one pattern of the secondary windings is situated facing one helix and the other pattern of the secondary windings is located facing the other helix, and on the other hand so that each helix (18, 20) is located facing both a first secondary winding and facing a second secondary winding in phase opposition with the first secondary winding.

Finally, an aspect of the present invention concerns a method for noncontact measurement of the angular position of a shaft, distinguished in that it involves the following steps:

providing the outer surface of the shaft with two helices of opposite directions, the helices being distant from one another, along the angular measurement range, by a predetermined distance which is a function of the estimated axial displacement of the shaft, furnishing an inductive position sensor with one primary winding and at least two secondary windings, one secondary winding being defined by a set of at least two loops in phase with each other, arranging the loops of each secondary winding facing the helices so that when the angular position of the shaft varies by a value, then on the one hand for one secondary winding the variation in flux induced in the loops facing one helix is identical to that of the flux induced in the loops facing the other helix, and on the other hand the variation in flux induced in the loops of one secondary winding facing one helix is identical but opposite the variation in flux induced in the loops of the other secondary winding, the loops facing one helix being separated from the loops facing the other helix by a distance corresponding to the distance separating the helices along the angular measurement range, excitation of the primary winding and measurement of the signal on the secondary windings, determination of the angular position of the shaft, the measured signal corresponding to an angular value of the position of the shaft independent of an axial displacement of the latter.

In order to facilitate the implementing of this method, one may for example arrange for the helices to be disposed on a cylindrical surface of the shaft symmetrically with respect to a transverse plane of said cylindrical surface.

Advantageously, such a method also makes it possible to measure an axial displacement of the shaft. For this purpose, it may then involve also the following steps:

providing the sensor with at least two additional secondary windings, arranging the loops of each additional secondary winding facing the helices so that when the angular position of the shaft varies by a value, then on the one hand for one secondary winding the variation in flux induced in the loops facing one helix is identical but opposite to that of the flux induced in the loops facing the other helix, and on the other hand the variation in flux induced in the loops of one secondary winding facing one helix is identical to that of the flux induced in the loops of the other secondary winding, the loops facing one helix being separated from the loops facing the other helix by a distance corresponding to the distance separating the helices along the angular measurement range measuring the signal on the additional secondary windings, determination of the axial position of the shaft, the signal measured in the area of the additional secondary windings corresponding to position of the shaft independent of the angular position of the latter.

BRIEF DESCRIPTION OF THE DRAWINGS

Details and advantages of aspects of the present invention will better appear from the following description, made in reference to the appended schematic drawing, in which.

DETAILED DESCRIPTION OF THE PREFERRED EMBODIMENTS

Figure 1:
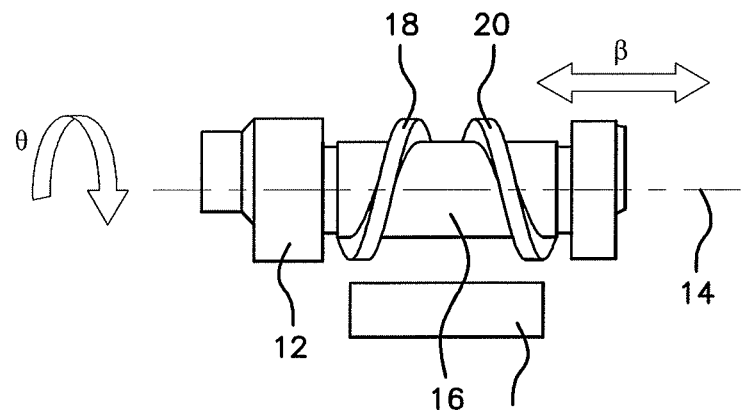
FIG. 1 is a side view of a shaft on which a measurement of angular position (and possibly axial position) is to be done.

FIG. 1 illustrates a shaft 12 of longitudinal axis 14. This shaft 12 is driven in rotation and its angular position is given by an angle θ. It is able to move in a lateral translation β in the longitudinal direction corresponding to the longitudinal axis. The displacement in translation can be a parasitic displacement (which is then in the order of a tenth of a millimeter, for example) and/or a controlled displacement.

For example, this may be a camshaft of a motor vehicle. This shaft 12 has a cylindrical zone 16 on which a first helix 18 and a second helix 20 are produced. These two helices in the preferred embodiment illustrated here have the same characteristics and are disposed symmetrically to a transverse plane of the shaft 12. Thus, these two helices have the same pitch, but opposite directions. It is assumed here that they extend for 360° about the cylindrical zone 16. It is assumed that the maximum lateral displacement of the shaft 12 along the longitudinal axis 14 is δ. The first helix 18 will then be spaced from the second helix 20 by a distance at least equal to 2δ.

Figure 2:
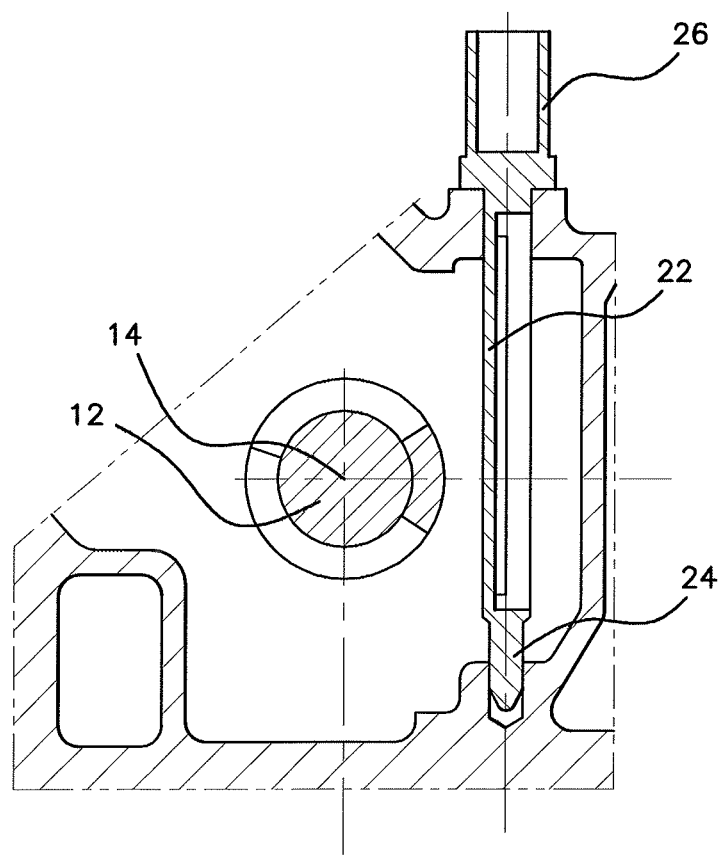
FIG. 2 is a cross sectional view of the shaft of FIG. 1 illustrating a noncontact position sensor.

The first helix 18 and the second helix 20 cooperate with a position sensor 22 realized on an integrated circuit board, itself being mounted on a support 24 associated with a connector 26. The position sensor 22 is mounted in a plane parallel to the longitudinal axis 14 of the shaft 12 facing the helices and in proximity to them, yet without having contact with them. FIG. 2 illustrates in transverse section with regard to the shaft 12 the position of the position sensor 22 in relation to the shaft. A free space in the order of a millimeter (from 0.5 to 5 mm) remains between the helices and the position sensor 22.

The position sensor 22 is adapted, first of all, to determine the angular position of the shaft 12 independently of its lateral position, that is, independently of its position along the longitudinal axis 14. Furthermore, as an option, it is provided to determine the position of the shaft 12 likewise along its longitudinal axis 14.

Figure 3:
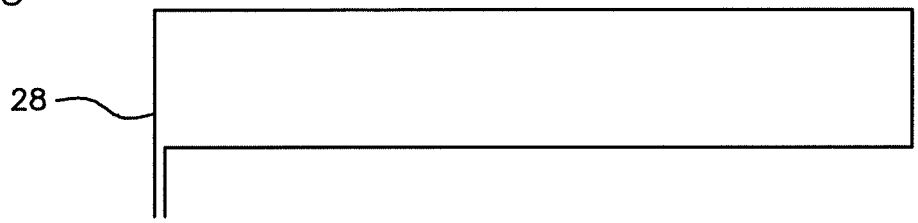
FIG. 3 illustrates schematically a primary winding which can be used for the sensor illustrated in FIG. 2, FIGS. 4 to 7 illustrate schematically secondary windings which can be used for the sensor illustrated in FIG. 2.
Figure 4:
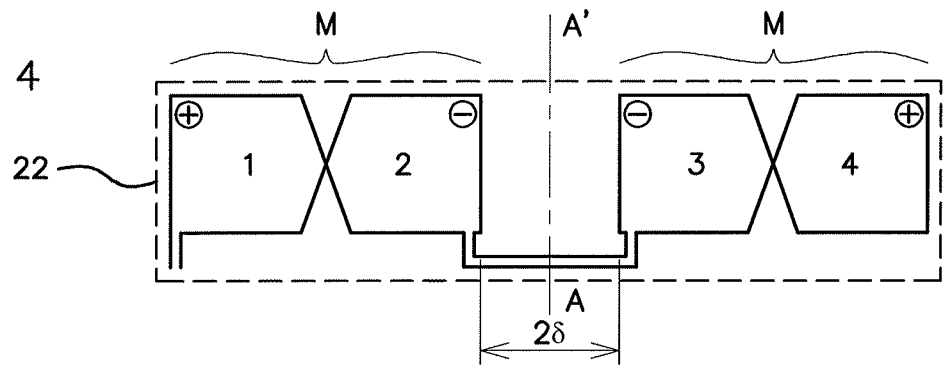
Figure 5:
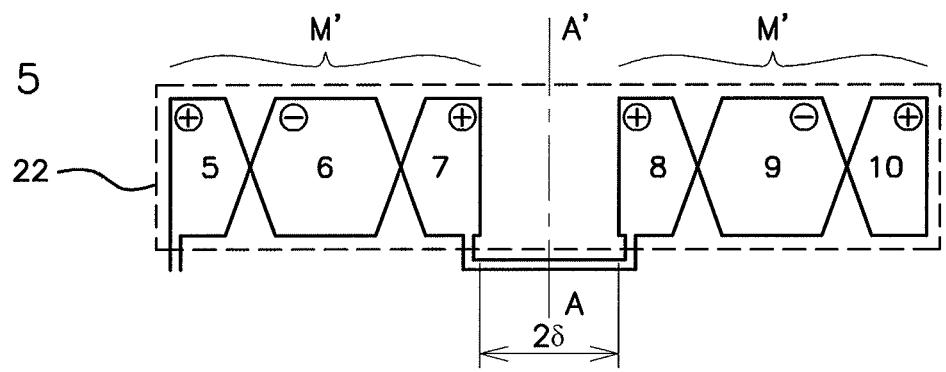

In order to determine the angular position (angle θ), the position sensor 22 is an inductive sensor comprising a primary circuit 28 (FIG. 3) associated with a secondary circuit (FIG. 4 or FIG. 5). In a way known to the skilled person, the primary circuit 28 is excited by a high-frequency signal and a target, here the helices (first helix 18 and second helix 20) realize a coupling with the corresponding secondary circuit. By measuring the electrical voltage (signal) on the terminals of the secondary circuit, it is possible to learn the position of the helices in relation to the position sensor 22 and thus the angular position of the shaft 12.

Like the primary circuit, the secondary circuit is printed on a board, also called a PCB (Printed Circuit Board). A first form of secondary circuit is illustrated in FIG. 4 and a variant embodiment is illustrated in FIG. 5.

In the embodiment of FIG. 4, the secondary circuit has two windings connected in series and in phase opposition to each other. One notices in this FIG. 4 the presence of four loops numbered 1 to 4. The loops 1 and 4 form a first winding: they are connected in series and are in phase. Likewise, the loops 2 and 3 form a second winding: they are connected in series and are in phase. The first winding is connected to the second winding and is in phase opposition with the second winding.

The four loops 1, 2, 3 and 4 are aligned along an axis parallel to the longitudinal axis 14 of the shaft 12. They each have substantially the same surface so that the flux induced by the primary circuit in each of them in the absence of the target has a same absolute value. The loops 1 and 2 are designed to face the first helix 18 while the loops 3 and 4 are designed to face the second helix 20. The loops 1 and 2 form a pattern M which is symmetrical to the pattern M formed by the loops 3 and 4 in relation to a middle line AA'. In a same pattern M (1 and 2 or 3 and 4), each time there is at least one loop in phase opposition with another loop of the same pattern. It is further noticed that the two patterns M are separated. The separation distance between the two patterns (corresponding in FIG. 4 to the separation distance between the loop 2 and the loop 3) is the same as the distance separating the first helix 18 from the second helix 20, for example 2δ.

FIG. 5 illustrates a variant embodiment of the secondary circuit shown in FIG. 4. One finds here six loops numbered 5 to 10. The secondary circuit is formed by two windings connected in series and in phase opposition relative to each other. The loops 5, 7, 8 and 10 form a first winding: they are connected in series and are in phase. The loops 6 and 9 form a second winding. They are connected in series and are in phase but are in phase opposition to the loops 5, 7, 8 and 10.

Here as well, the loops of the secondary circuit are aligned along an axis parallel to the longitudinal axis 14 of the shaft 12. The loops 5, 6 and 7 form a first pattern M' symmetrical with a second pattern M' formed by the loops 8, 9 and 10, along the middle line AA'. These two patterns are symmetrical in regard to the middle line AA' and are separated from one another by a distance which corresponds here as well to the distance separating the first helix 18 from the second helix 20, or 2δ.

In each of the patterns, the surface of the loops of a winding is equal to the surface of the loops of the other winding. Thus, we have here in the first pattern the loops 5 and 7, each one having a surface substantially equal to half the surface of the loop 6. Thus, the flux induced in the loops of a winding in a pattern by the primary circuit is, in absolute value, the same as that induced by the primary circuit in the loops of the other winding.

Figure 8:
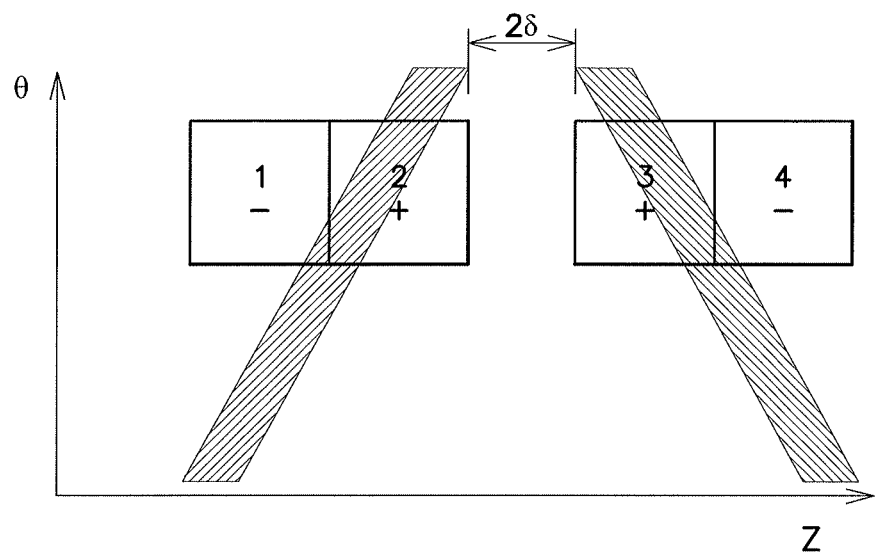
FIG. 8 illustrates very schematically secondary windings facing a shaft for which the angular position is being measured along a given range (less than 360°)

The measurement principle for the angular position θ of the shaft 12 with the aid of the position sensor 22 is explained in reference to FIG. 8. In this figure, it is assumed that the position sensor 22 comprises the primary circuit 28 of FIG. 3 superimposed on the secondary circuit of FIG. 4.

In FIG. 8, which is a very schematic figure, there is represented the first helix 18, the second helix 20 and only the secondary circuit of FIG. 4 with its four loops 1, 2, 3 and 4. There is represented in this figure an abscissa axis Z and the ordinate axis corresponds to the angular position θ. It is assumed that the secondary circuit (loops 1, 2, 3 and 4) is fixed. The helices are each represented by an inclined band:

this corresponds to what is perceived by the sensor (secondary circuit) of the helices 18, 20 when the shaft 12 is rotating in front of it.

FIG. 8 corresponds to one angular position and one axial position of the shaft 12. If the shaft 12 is rotating, then the inclined bands representing the helices rise or fall along the ordinate axis in FIG. 8. If the shaft 12 moves axially, then the inclined bands are displaced in relation to the sensor along the abscissa axis.

In the specific case of FIG. 8, it is assumed that the measurement of the angular position is done in a predetermined range, less than 360°.

When the shaft 12 is rotating and θ increases, the free surface of the loop 1 diminishes. When the shaft 12 is displaced toward the increasing Z, the free surface of the loop 1 increases. Say that φ1 is the flux induced in the loop 1. This flux will be inversely proportional to the angle θ and proportional to the longitudinal position Z. Since the loop 1 is assumed to be in phase opposition with the primary circuit, one chooses a negative constant (−φ0) to determine φ1.

One will then have:

$$\varphi1=-\varphi0(-\theta+Z)$$

Applying the same reasoning to the other loops, one obtains:

$$\varphi2=\varphi0(\theta-Z)$$

$$\varphi3=\varphi0(\theta+Z)$$

$$\varphi4=-\varphi0(-\theta-Z)$$

The signal measured on the terminals of the secondary circuit will be proportional to the sum of the fluxes circulating in the loops 1, 2, 3 and 4.

One thus has:

$$\Sigma\varphi=\varphi1+\varphi2+\varphi3+\varphi4$$

$$\Sigma\varphi=\varphi0(\theta-Z+\theta-Z+\theta+Z+\theta+Z)$$

or $$\Sigma\varphi=4\varphi0*\theta$$

It thus emerges that the signal on the terminals of the secondary circuit is proportional to the angular position of the shaft 12 and insensitive to an axial displacement Z of the shaft 12.

A similar demonstration can be done with the secondary circuit illustrated in FIG. 5. This leads to the same result: the signal is proportional to the angle of rotation of the shaft and insensitive to a variation in axial position Z of this shaft 12.

In the preceding calculation, it was assumed that each time there was only a single loop 1, a single loop 2, a single loop 3 and a single loop 4. In order to obtain a greater sensitivity, it is clear that one can superimpose each time several loops to increase the induced flux and thus obtain a better sensitivity.

It also emerges from the preceding calculation that it is advisable to have each helix permanently facing the two windings at the same time (1, 4 and 2, 3 in the embodiment of FIGS. 4 and 8) so as to obtain the above calculated flux compensation in regard to a displacement in translation. It is sufficient here to adapt the geometry of the windings to that of the helices. The size, and the position, of the loops are adapted to the pitch of the helices, to their width, to their position and to their maximum displacement in translation along the measurement range in question. Thus, each helix is located along the angular measurement range facing both a first secondary winding and a second secondary winding in phase opposition with the first secondary winding.

Figure 9:
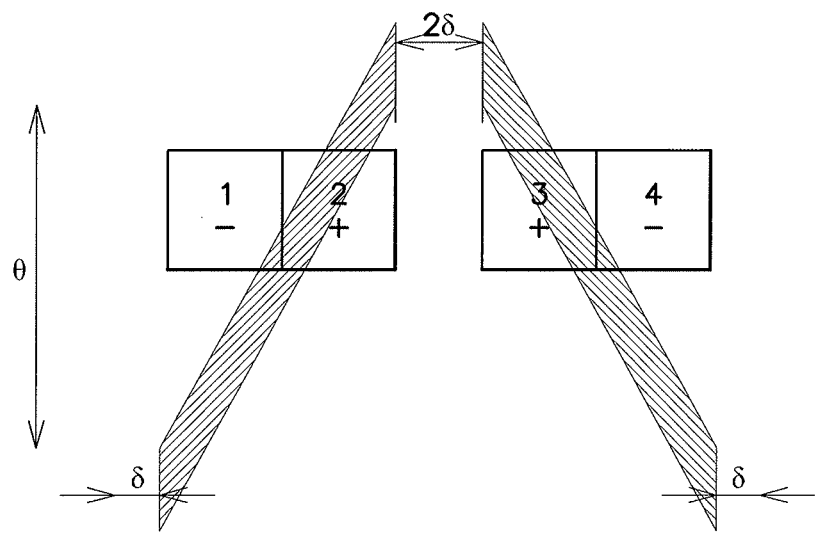
FIG. 9 illustrates very schematically secondary windings facing a shaft for which the angular position is being measured along a range of 360°.

FIG. 9 illustrates a measurement of the angular position over 360°. The measurement principle here remains the same. The shape of the ends of the helices is adapted so that the variation in induced flux remains the same for the same angular variation along the entire measurement range, that is, 360°. Thus, one arranges here for the helices to extend for 360° about the shaft 2 and for their ends of the helices to be situated in a radial plane with respect to the shaft 12. It is likewise advisable to make sure that the cylindrical zone 16 does not have any bosses or the like forming a target at a distance less than δ from the ends of the helices.

Figure 10:
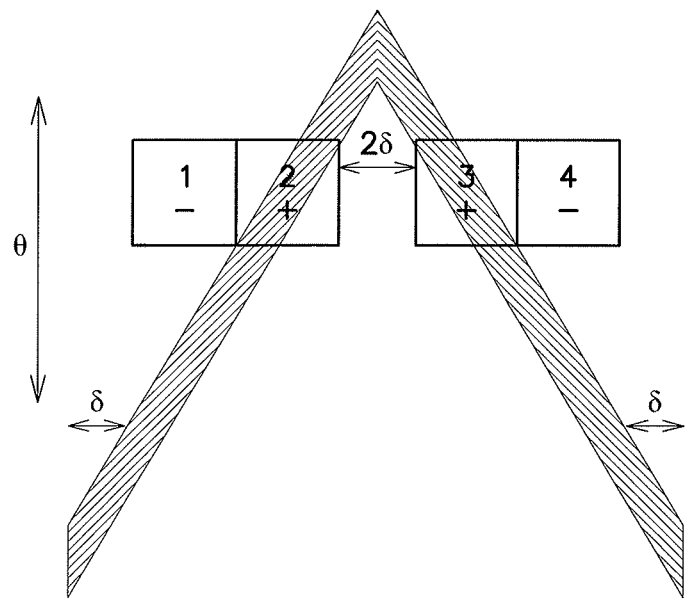
FIGS. 10 and 11 are views similar to FIGS. 8 and 9 for variant embodiments of the shaft on which the measurement of angular position is realized.
Figure 11:
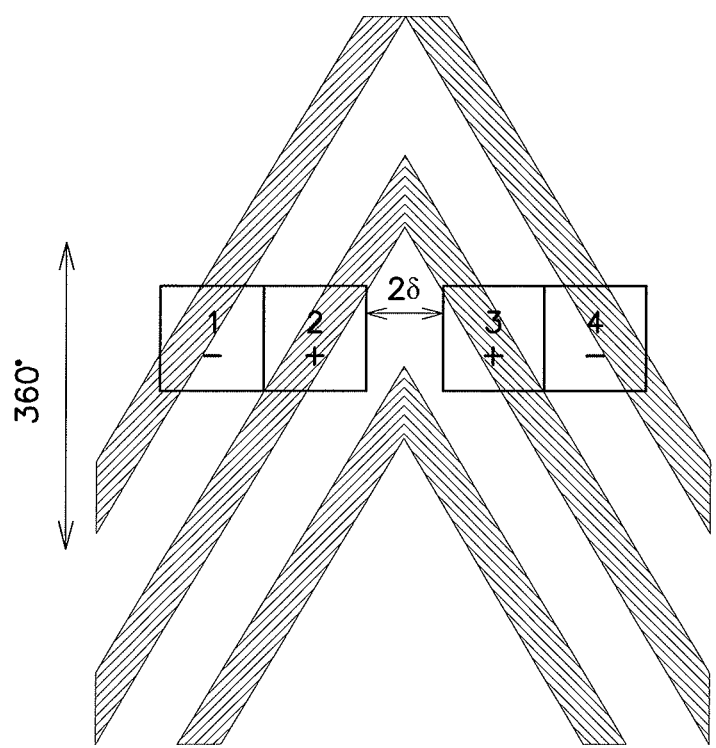

As illustrated in FIG. 10, it is possible to join the helices to form a chevron. For a measurement performed for several poles, such as a shaft with a motor having several poles, it is possible to provide several helices or chevrons in the area of the cylindrical zone 16 provided for the measurement of position.

The transverse displacement along the longitudinal axis 14 of the shaft 12 can be a parasitic movement. However, it may be a controlled movement and it is then of interest to likewise be able to measure the displacement of the shaft 12 along its longitudinal axis Z.

Thanks to the presence of the two helices, of opposite direction, one can likewise measure the longitudinal displacement of the shaft 12. It is proposed here to superimpose an additional secondary circuit on the secondary circuit used to measure the angular position and on the primary circuit 28.

Figure 6:
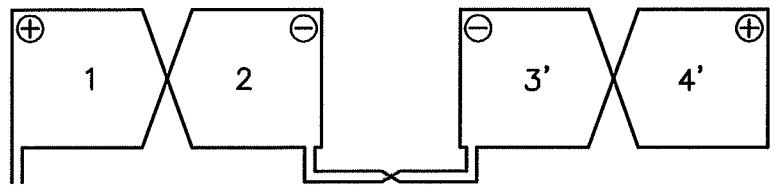
Figure 7:
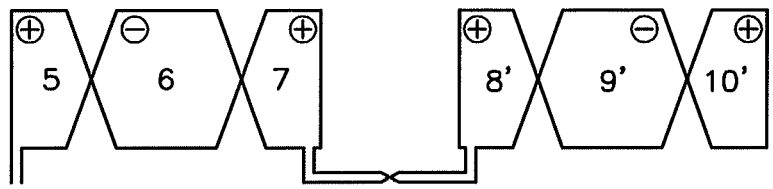

It is proposed here to use an additional secondary circuit such as that illustrated in FIG. 6 or in FIG. 7.

The additional secondary circuits proposed here are similar to the secondary circuits of FIGS. 4 and 5. One again finds two windings in phase opposition and two patterns each with loops of one winding and loops of the other winding such that in one pattern the surface of the loops of one winding corresponds to the surface of the loops of the other winding. As compared to the secondary circuits of FIGS. 4 and 5, the additional secondary circuits of FIGS. 6 and 7 again have the same pattern on one side, but the other pattern, likewise separated from the first pattern by a distance corresponding to the distance separating the helices, is in phase opposition. One can thus define the second pattern here as being the same pattern as the first pattern but offset along the longitudinal axis by a distance corresponding to the length of the pattern increased by the distance separating the two helices. Described in another way, one may consider that one loop of one winding of one pattern is symmetrical to one loop of the other winding of the other pattern.

In short, as appears clearly by comparing FIG. 4 with FIG. 6, the loops of the additional secondary circuit of FIG. 6 again have the same shape as the loops of the secondary circuit of FIG. 4 but the connection between the two patterns is inverted. One thus denotes the loops of FIG. 6 as: 1, 2, 3' and 4'. Likewise, in FIG. 7, one will have loops 5, 6, 7, 8', 9' and 10'.

The signal on the terminals of the additional secondary circuit corresponds to the flux induced by the primary circuit 28 in the loops of this circuit. As already done above, one calculates the fluxes in each of the loops of the additional secondary circuit. As per the above, one will again find the same flux for the loops 1 and 2 and an inverted flux for the loops 3' and 4' (in relation to the loops 3 and 4). One thus has:

$\phi 1 = -\phi 0(-\theta + Z)$ $\phi 2 = \phi 0(\theta - Z)$ $\phi 3' = -\phi 0(\theta + Z)$ $\phi 4' = \phi 0(-\theta - Z)$ The signal measured on the terminals of the additional secondary circuit will be proportional to the sum of the fluxes circulating in the loops 1, 2, 3' and 4'.

One thus has:

$\Sigma\phi = \phi 1 + \phi 2 + \phi 3' + \phi 4'$ $\Sigma\phi = \phi 0(\theta - Z + \theta - Z - \theta - Z - \theta - Z)$ or $\Sigma\phi = -4\phi 0 * Z$ It thus emerges that the signal on the terminals of the additional secondary circuit is proportional to the longitudinal position of the shaft 12 and it is insensitive to a displacement in rotation θ of the shaft 12.

Thus, by superimposing on the position sensor 22 a primary circuit 28 with a secondary circuit as illustrated in FIG. 4 or in FIG. 5 and moreover an additional secondary circuit as illustrated in FIG. 6 or in FIG. 7, it is possible to measure with precision, on the one hand, the angular position θ of the shaft 12 and on the other hand its axial position Z.

The above embodiment thus makes possible at the same time a measurement of the angular position θ of a shaft without being influenced by its axial position Z while also enabling a measurement of the axial position Z of this shaft. Thus, the same position sensor is able to perform two measurements of position (angular and longitudinal). Such a double measurement with a single sensor has not yet been accomplished to the knowledge of the inventors at the time of the filing of the patent application.

The position sensor (angular and/or longitudinal) proposed is of reduced footprint. It can also be used to produce a sensor of angular velocity of the shaft (also known as a "resolver").

The preferred embodiment proposed is to have targets in the shape of helices, the two helices having the same pitch but being opposite in direction. One could contemplate having a different pitch for the two helices, by then adapting the loops.

The invention claimed is:

1. An assembly formed from an inductive position sensor and a target, wherein the position sensor is a position sensor designed to measure the angular position of a shaft, the assembly comprising:

a support on which are realized, on the one hand, a primary winding and, on the other hand, at least two secondary windings in phase opposition to each other, each secondary winding being defined by a set of at least two loops in phase with each other, in which assembly the secondary windings are connected in series and are each arranged symmetrically with respect to a middle line so as to form each time a pattern on either side of this middle line, the two patterns having a separation between them in an area of said middle line, and wherein the target comprises two helices of opposite pitches, and wherein the inductive position sensor is disposed facing the target such that on the one hand one pattern of the secondary windings is located facing one helix and the other pattern of the secondary windings is located facing the other helix, and on the other hand so that each helix is located facing both a first secondary winding and facing a second secondary winding in phase opposition with the first secondary winding.

2. The assembly as claimed in claim 1, wherein each pattern comprises a first set of loops of a first winding adjacent to a second set of loops of a second winding, the loops of the first winding having a form similar to the loops of the second winding and a number of loops of the first set being equal to a number of loops of the second set.

3. The assembly as claimed in claim 2, wherein the sensor comprises at least two additional secondary windings in phase opposition with respect to each other and connected in series with each other, wherein each additional secondary winding is defined by a set of at least two loops in phase with each other, wherein the loops of an additional secondary winding are disposed in symmetrical manner to the loops of the other additional secondary winding in respect of said middle line, and wherein the loops of one additional secondary winding form, on one side of the middle line with the loops of the other additional secondary winding located on the same side of the middle line, a pattern separate from the pattern formed by the other loops of the additional secondary windings.

4. The assembly as claimed in claim 1, wherein each pattern comprises a first set of loops of a first winding adjacent to a second set of loops of a second winding and to a third set of loops of the second winding, the loops of the first winding having a surface which is double that of the loops of the second winding, the number of loops being equal for the three sets and the loops of the first set of loops being disposed between the loops of the second set of loops and those of the third set of loops in order to form an alignment of loops perpendicular to the middle line.

5. The assembly as claimed in claim 4, wherein the sensor comprises at least two additional secondary windings in phase opposition with respect to each other and connected in series with each other, wherein each additional secondary winding is defined by a set of at least two loops in phase with each other, wherein the loops of an additional secondary winding are disposed in symmetrical manner to the loops of the other additional secondary winding in respect of said middle line, and wherein the loops of one additional secondary winding form, on one side of the middle line with the loops of the other additional secondary winding located on the same side of the middle line, a pattern separate from the pattern formed by the other loops of the additional secondary windings.

6. The assembly as claimed in claim 1, wherein the sensor comprises at least two additional secondary windings in phase opposition with respect to each other and connected in series with each other, wherein each additional secondary winding is defined by a set of at least two loops in phase with each other, wherein the loops of an additional secondary winding are disposed in symmetrical manner to the loops of the other additional secondary winding in respect of said middle line, and wherein the loops of one additional secondary winding form, on one side of the middle line with the loops of the other additional secondary winding located on the same side of the middle line, a pattern separate from the pattern formed by the other loops of the additional secondary windings.

7. The assembly as claimed in claim 1, wherein the helices are disposed on a cylindrical surface of the shaft, symmetrically with respect to a transverse plane of said cylindrical surface.

8. A method for noncontact measurement of the angular position of a shaft, comprising:
   providing the outer surface of the shaft with two helices of opposite directions, the helices being distant from one another, along the angular measurement range, by a predetermined distance which is a function of the estimated axial displacement of the shaft,
   furnishing an inductive position sensor with one primary winding and at least two secondary windings, one secondary winding being defined by a set of at least two loops in phase with each other,
   arranging the loops of each secondary winding facing the helices so that when the angular position of the shaft varies by a value, then on the one hand for one secondary winding the variation in flux induced in the loops facing one helix is identical to that of the flux induced in the loops facing the other helix, and on the other hand the variation in flux induced in the loops of one secondary winding facing one helix is identical but opposite the variation in flux induced in the loops of the other secondary winding, the loops facing one helix being separated from the loops facing the other helix by a distance corresponding to the distance separating the helices along the angular measurement range,
   exciting the primary winding and measuring the signal on the secondary windings, and
   determining the angular position of the shaft, the measured signal corresponding to an angular value of the position of the shaft independent of an axial displacement of the latter.

9. The method as claimed in claim 8, wherein it also makes it possible to measure an axial displacement of the shaft and further comprises:
   providing the sensor with at least two additional secondary windings,
   arranging the loops of each additional secondary winding facing the helices so that when the angular position of the shaft varies by a value, then on the one hand for one secondary winding the variation in flux induced in the loops facing one helix is identical but opposite to that of the flux induced in the loops facing the other helix, and on the other hand the variation in flux induced in the loops of one secondary winding facing one helix is identical to that of the flux induced in the loops of the other secondary winding, the loops facing one helix being separated from the loops facing the other helix by a distance corresponding to the distance separating the helices along the angular measurement range
   measuring the signal on the additional secondary windings, and
   determining the axial position of the shaft, the signal measured in the area of the additional secondary windings corresponding to position of the shaft independent of the angular position of the latter.

* * * * *